United States Patent
Ortiz

(10) Patent No.: US 7,141,940 B2
(45) Date of Patent: Nov. 28, 2006

(54) METHOD AND CONTROL CIRCUITRY FOR PROVIDING AVERAGE CURRENT MODE CONTROL IN A POWER CONVERTER AND AN ACTIVE POWER FILTER

(75) Inventor: Joe A. Ortiz, Garden Grove, CA (US)

(73) Assignee: Raytheon Company, Waltham, MA (US)

( * ) Notice: Subject to any disclaimer, the term of this patent is extended or adjusted under 35 U.S.C. 154(b) by 84 days.

(21) Appl. No.: 11/109,433

(22) Filed: Apr. 19, 2005

(65) Prior Publication Data

US 2006/0232226 A1    Oct. 19, 2006

(51) Int. Cl.
*H05B 37/02* (2006.01)

(52) U.S. Cl. ............ 315/291; 323/272; 323/282; 363/34

(58) Field of Classification Search ........ 315/291, 315/307, 308; 323/272, 280, 281, 282; 363/34, 363/89, 127
See application file for complete search history.

(56) References Cited

U.S. PATENT DOCUMENTS

| | | | | |
|---|---|---|---|---|
| 5,731,692 A | * | 3/1998 | Garcia | 323/274 |
| 5,804,950 A | * | 9/1998 | Hwang et al. | 323/222 |
| 6,009,000 A | * | 12/1999 | Siri | 363/21.09 |
| 6,211,657 B1 | * | 4/2001 | Goluszek | 323/272 |
| 6,275,397 B1 | * | 8/2001 | McClain | 363/89 |
| 6,657,417 B1 | * | 12/2003 | Hwang | 323/222 |
| 7,019,503 B1 | * | 3/2006 | Ortiz et al. | 323/282 |
| 7,038,435 B1 | * | 5/2006 | Ortiz et al. | 323/282 |
| 2005/0036245 A1 | * | 2/2005 | Greenfeld | 361/18 |
| 2005/0100474 A1 | * | 5/2005 | Ortiz et al. | 323/282 |

* cited by examiner

*Primary Examiner*—Trinh Vo Dinh
(74) *Attorney, Agent, or Firm*—Leonard A. Alkov; Karl A. Vick

(57) ABSTRACT

Control circuitry uses modified average current mode control to regulate average current through an inductor of a power converter. Control circuitry uses modified average current mode control to regulate average current through an inductor of an active power filter. This average current mode control negates modulation of the average inductor current. In this way, output ripple current of the power converter does not have a significant effect on the input current drawn by the power converter.

24 Claims, 4 Drawing Sheets

METHOD AND CONTROL CIRCUITRY FOR PROVIDING AVERAGE CURRENT MODE CONTROL IN A POWER CONVERTER AND AN ACTIVE POWER FILTER

PRIORITY CLAIMS AND CROSS-REFERENCE TO RELATED APPLICATIONS

This application incorporates by reference and claims the benefit of priority under 35 U.S.C. 120 to U.S. patent application Ser. No. 10/720,297 filed Nov. 24, 2003 now U.S. Pat. No. 7,038,435, which is assigned to same assignee as the present application and incorporated herein by reference.

This application also incorporates by reference and claims the benefit of priority under 35 U.S.C. 120 to U.S. patent application Ser. No. 11/053,295 filed Feb. 7, 2005 now U.S. Pat. No. 7,019,503, which is assigned to same assignee as the present application and incorporated herein by reference.

TECHNICAL FIELD

Embodiments of the present invention pertain to control circuitry for power converters and active power filters.

BACKGROUND

Electronics systems, such as communication systems, radar systems, infrared sensor systems, laser tracking systems, or directed energy systems, whether ground based, mobile, airborne, shipboard, or spacecraft based, generally have several subsystems that are provided power from a power source over an electric power bus. Certain subsystems may draw a ripple current from the power source that may affect the other subsystems. Several specifications, such as MIL STD 461, address the quantity and frequency content of ripple current that may be reflected to an electric power bus, in addition to other EMC requirements.

For example, in the case of certain types of sensor systems, a cryogenic cooler electronics control system may draw 10 amps or more of ripple current at a nominal frequency between 70 and 100 Hz from the electric power bus. In some applications, such as a satellite system, this large ripple current draw may destabilize the bus and may degrade the performance of other electronics subsystems using the bus, particularly those managing low power sensor signals. For another example, in the case of a laser system that generates pulsed output energy, or a directed energy system that generates pulses of RF energy, the current required for the pulsed output may similarly reflect back to an electric power bus, and may destabilize the electric power bus.

Conventional approaches to reduce the ripple current on an electric power bus utilize low frequency low pass passive filters with large capacitors and inductors. However, the size and weight of the large capacitors and inductors required for low frequency low pass filter bandwidth make these approaches undesirable for applications where size and/or weight are important factors. Other conventional approaches include the use of shunt regulators in parallel with the fluctuating load. These shunt regulators draw load current under light load conditions and reduce shunt power under system heavy load conditions, thus keeping the net current draw from a power source constant.

Thus, there are needs for controls and methods that control power converter current accurately on a pulse-by-pulse basis using average current mode control. There are also needs for systems and methods that control and regulate input current drawn from an electric power bus. There are also needs to attenuate ripple current reflected to an electric power bus.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar or identical items throughout the figures and:

SUMMARY

In some embodiments, control circuitry may use modified average current mode control to regulate average current through an inductor of a power converter on a pulse-by-pulse basis. This modified average current mode control may provide improved control of the average inductor current. In some embodiments, control circuitry may also use average current mode control or modified average current mode control to regulate average current through an inductor of an active power filter on a pulse-by-pulse basis. This average current mode control may substantially negate modulation of the average inductor current. In this way, output ripple voltage of an active power filter may not have a significant effect on the input current drawn by the active power filter.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

In accordance with embodiments of the present invention, a power converter may use modified average current mode control to control and regulate average current through an inductor of a power converter on a pulse-by-pulse basis. This modified average current mode control may provide improved control of the average inductor current.

In accordance with embodiments of the present invention, an active power filter may operate off a DC voltage bus and may provide a DC current draw with a substantial reduction of input ripple current reflected back to the power source. The active power filters of some embodiments may attenuate current ripple drawn from the bus by a minimum of 30 dB with power throughput efficiency greater than 90%, at significantly reduced size and weight over passive filtering.

Figure 1:
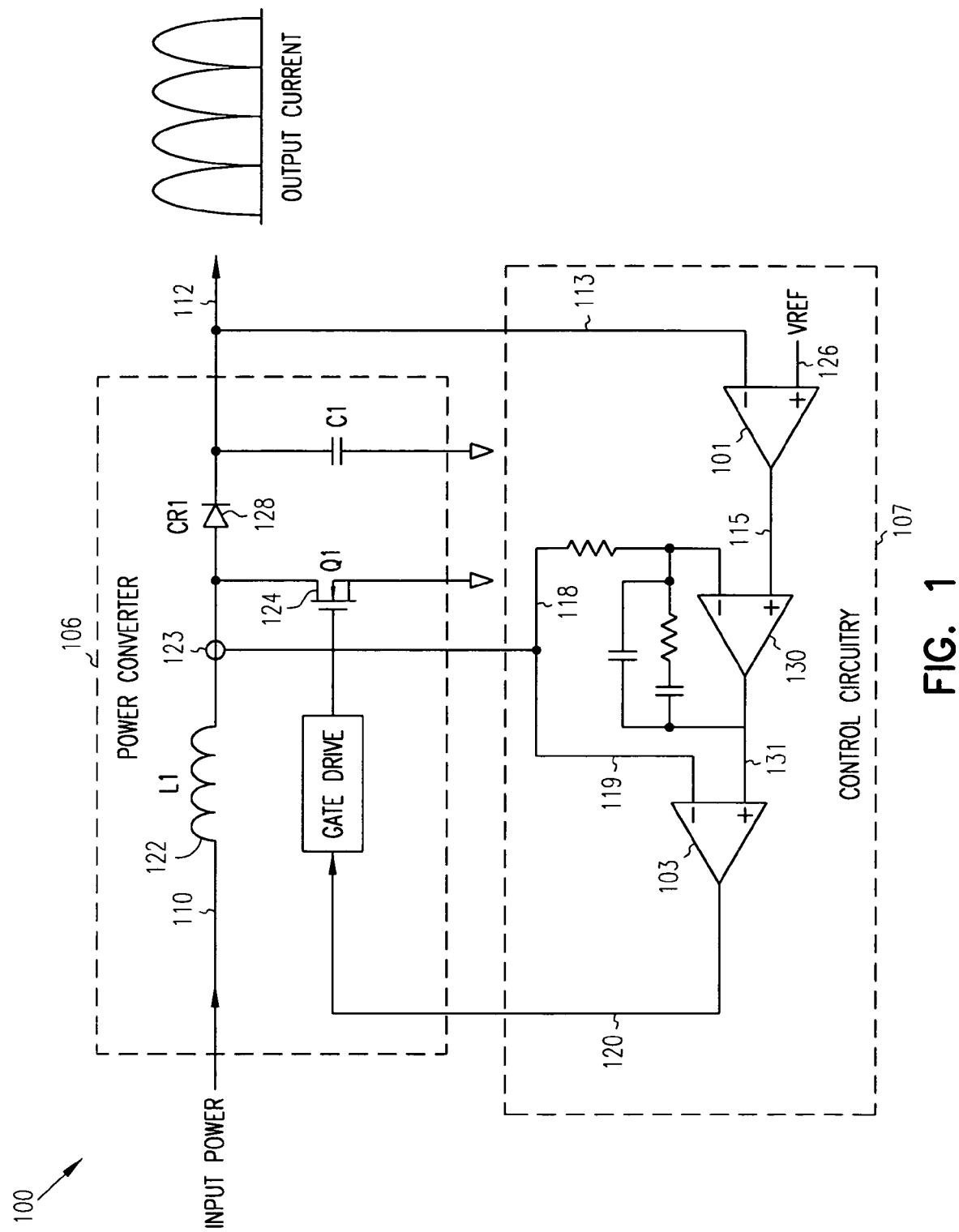
FIG. 1 is a circuit diagram of a power converter and control circuitry in accordance with some embodiments of the present invention.

FIG. 1 is a circuit diagram of a power converter and control circuitry utilizing modified average current mode control in accordance with some embodiments of the present invention. In the embodiments illustrated in FIG. 1, power converter 100 comprises power converter 106 and control circuitry 107.

Power converter 106 and control circuitry 107 may operate together to provide a regulated DC output voltage. In accordance with these embodiments, control circuitry 107 may use a modified average current mode control technique for regulating an average current through an inductor of a power converter. This modified average current mode control may provide additional benefits due to the use of a current mode control inner current loop, as opposed to the standard use of a voltage mode control inner current loop.

In accordance with some embodiments, control circuitry 107 may comprise voltage error amplifier 101 to generate voltage error amplifier output 115 based on the difference between output voltage 113 of power converter 106 and reference voltage 126. Voltage error amplifier feedback circuitry, bias circuitry, and compensation circuitry are not shown in FIG. 1 for clarity. Control circuitry 107 may also comprise current error amplifier 130 to generate current error amplifier output 131 based on voltage error amplifier output voltage 115 and current sense signal 118. Control circuitry 107 may also comprise comparator 103 to generate current regulation signal 120 based on current error amplifier output 131 and current sense signal 119. In these embodiments, current regulation signal 120 may comprise switching signals in which the duty cycle of the switching signals may be modulated, based at least in part on a difference between current error amplifier output 131 and current sense signal 119. Compensation of current error amplifier 130 may be different than that illustrated.

In some embodiments, current sense signals 118 and 119 may comprise a voltage corresponding to a sensed current in inductor 122 of power converter 106. In these embodiments, the sensed current may be directly controlled on a pulse-by-pulse basis. Current sense signals 118 and 119 may be generated by any of several ways by those of ordinary skill in the art, including methods presented in Unitrode (Texas Instruments) Application Note U-140, 'Average Current Mode Control of Switching Power Supplies', section titled 'Current Sensing', although the scope of the invention is not limited in this respect. The controlled current may be sensed in a different locations than those illustrated.

In some embodiments, comparator 103 may generate a pulse width modulated square wave current regulation signal 120 by comparing a difference between current error amplifier output 131 and current sense signal 119. Current regulation signal 120 may control one or more switching transistors of power converter 106 to control the average current through an inductor of power converter 106.

In some embodiments, power converter 106 may comprise either an isolated power converter, such as a flyback, forward, push pull, or full bridge power converter, or a non-isolated power converter, such as a boost, buck, buck boost, or tapped buck power converter, or multiple paralleled converters, although the scope of the invention is not limited in this respect.

In some embodiments, the inductor of the power converter whose current is controlled may be on the input side of the power converter, such as in a boost converter, or the inductor may be on the output side of the power converter, such as in a buck converter, although the scope of the invention is not limited in this respect.

Figure 2:
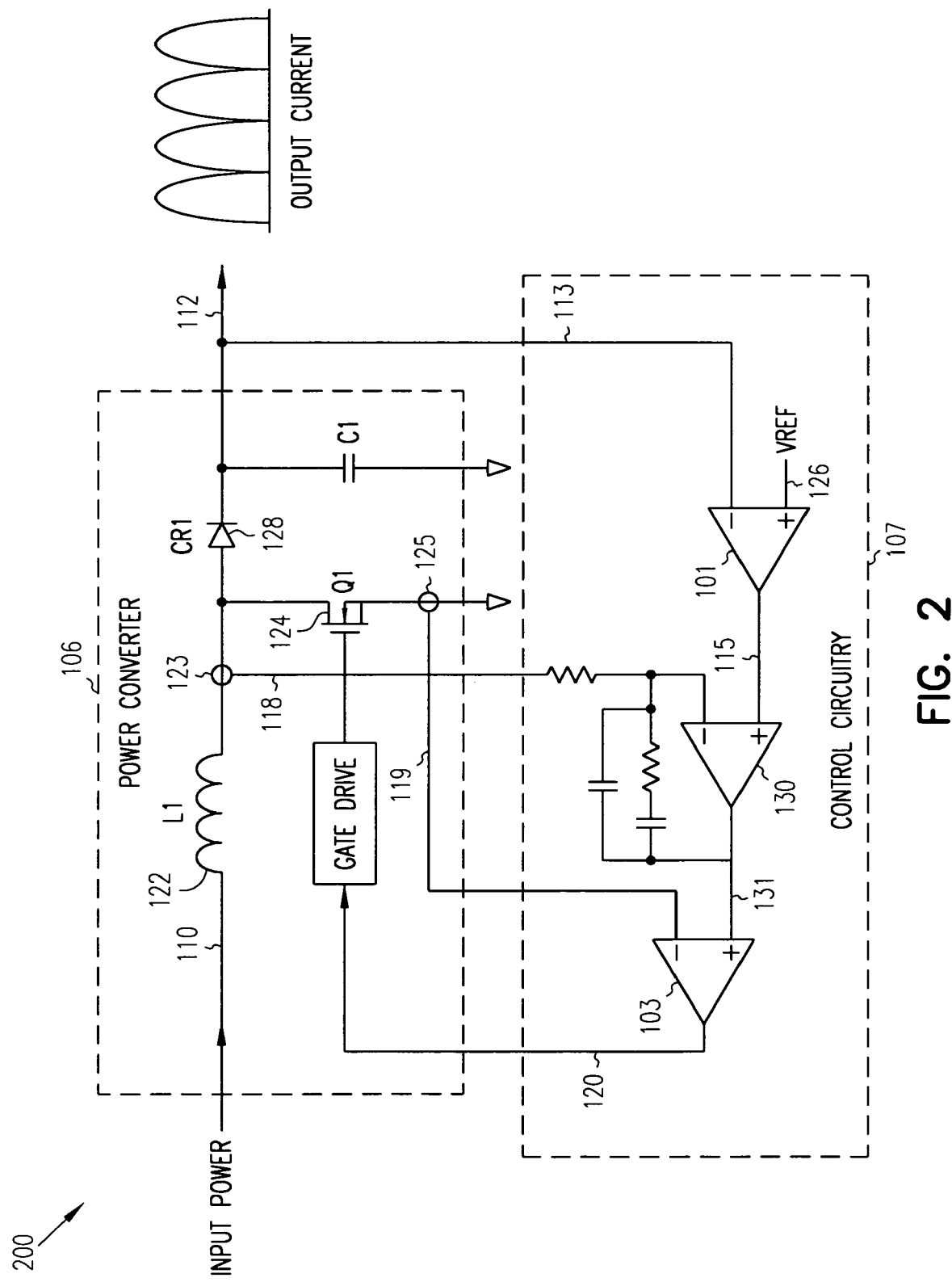
FIG. 2 is a circuit diagram of a power converter and control circuitry in accordance with some embodiments of the present invention.

FIG. 2 is a circuit diagram of a power converter and control circuitry utilizing modified average current mode control in accordance with some embodiments of the present invention. In the embodiments illustrated in FIG. 2, power converter 200 comprises power converter 106 and control circuitry 107. In the embodiments illustrated in FIG. 2, current sense signal 118 may comprise a voltage corresponding to a sensed current in inductor 122 of power converter 106. Current sense signal 119 may comprise a voltage corresponding to a sensed current that is switched (i.e., discontinuous) as at either a source or a drain terminal of switching transistor 124 of the power converter, or source or drain terminals of multiple switching transistors of the power converter. In these embodiments, the sensed current may be directly controlled on a pulse-by-pulse basis. In these embodiments, the average of the inductor current may be controlled by current error amplifier 130, and the modified average current mode control loop regulates the average inductor current with possibly improved noise immunity over the embodiment illustrated in FIG. 1. Compensation of current error amplifier 130 may be different than that illustrated.

Current sense signals 118 and 119 may be generated by any of several ways by those of ordinary skill in the art, including methods presented in Unitrode (Texas Instruments) Application Note U-140, 'Average Current Mode Control of Switching Power Supplies', section titled 'Current Sensing', although the scope of the invention is not limited in this respect. The controlled current may be sensed in a different locations than those illustrated.

In some embodiments, power converter 106 may comprise either an isolated power converter, such as a flyback, forward, push pull, or full bridge power converter, or a non-isolated power converter, such as a boost, buck, buck boost, or tapped buck power converter, or multiple paralleled converters, although the scope of the invention is not limited in this respect.

In some embodiments, the inductor of the power converter whose current is controlled may be on the input side of the power converter, such as in a boost converter, or the inductor may be on the output side of the power converter, such as in a buck converter, although the scope of the invention is not limited in this respect.

Figure 3:
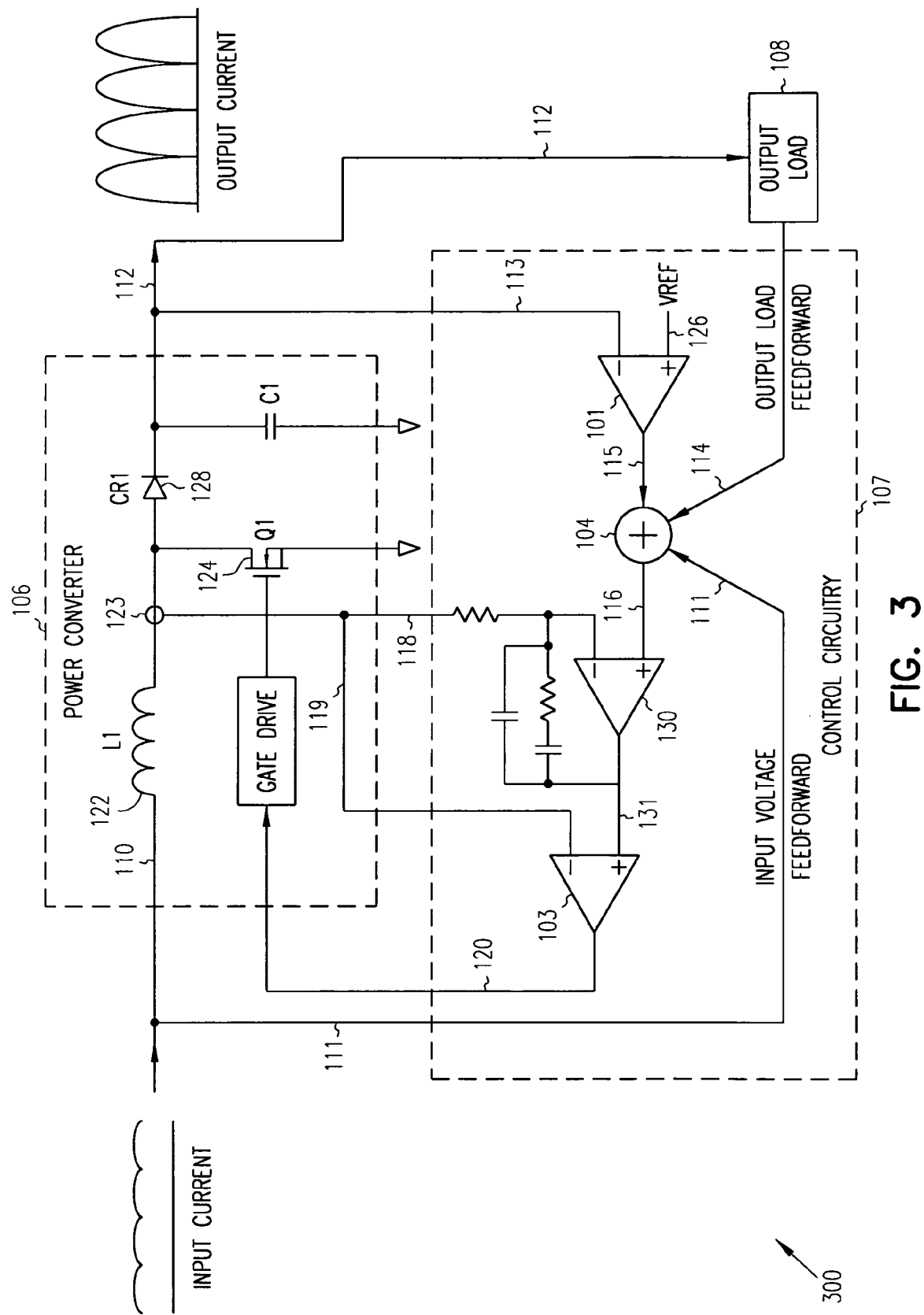
FIG. 3 is a circuit diagram of an active power filter in accordance with some embodiments of the present invention.

FIG. 3 is a circuit diagram of an active power filter in accordance with some embodiments of the present invention. The active power filter 300 may be similar to a conventional switch-mode DC power supply, but whereas the typical DC power supply provides a regulated output (normally regulated DC voltage), the active filter 300 may provide a regulated input (DC input current), with a significant reduction in ripple current reflected back to the input power bus, while also delivering a regulated DC output voltage. In the active power filter of FIG. 3, the control circuitry may utilize modified average current mode control to regulate inductor current on a cycle-by-cycle basis. Thus, a modified average current mode control scheme may be used to provide a regulated input current, with a significant reduction in ripple current reflected back to the input power bus, if the voltage error amp output does not modulate at the frequencies to be attenuated. This may be accomplished by the use of a very low bandwidth control loop to regulate output voltage. Given a low bandwidth loop, the converter may be unable to rapidly respond to changes in input voltage and output load current, and output voltage regulation may suffer. Input voltage feedforward and output load feedforward may be added to maintain output voltage regulation.

In the embodiments illustrated in FIG. 3, active power filter 300 may comprise power converter 106 and control circuitry 107. In accordance with some embodiments, control circuitry 107 may comprise voltage error amplifier 101 to generate voltage error amplifier output 115 based on the difference between output voltage 113 of power converter 106 and reference voltage 126. Voltage error amplifier feedback circuitry, bias circuitry, and compensation circuitry are not shown for clarity. In the embodiments illustrated in FIG. 3, control circuitry 107 may further comprise summing circuitry 104 to combine voltage error amplifier output 115 with input voltage feedforward signal 111 and output load feedforward signal 114 to generate summed signal 116. Current error amplifier 130 may generate current error amplifier output 131 based on the difference between summed signal 116 and current sense signal 118. Compensation of current error amplifier 130 may be different than that illustrated.

In some embodiments, input voltage feedforward signal 111 may correspond to an input voltage of power converter 106, and output load feedforward signal 114 may indicate the level of output current 112, or a change in output current 112, or an anticipated change in output current 112 drawn by output load 108 receiving output current from power converter 106.

In these embodiments, the input signals to summing circuitry 104 may be weighted, scaled, and/or combined based on the performance requirements of active power filter 300. In these embodiments, the inductor current of the active power filter may be controlled on a pulse-by-pulse basis through the use of modified average current mode control. Thus, in these embodiments, the modified average current mode control loop may regulate input current 110 to a DC level, and may thus provide significant reduction in ripple current reflected back to the input power bus. In some embodiments, active power filter 300 may achieve an input ripple current attenuation exceeding 30 dB.

Current sense signals 118 and 119 may be generated by any of several ways by those of ordinary skill in the art, including methods presented in Unitrode (Texas Instruments) Application Note U-140, 'Average Current Mode Control of Switching Power Supplies', section titled 'Current Sensing', although the scope of the invention is not limited in this respect. The controlled current may be sensed in a different locations than those illustrated.

In some embodiments, power converter 106 may comprise either an isolated power converter, such as a flyback, forward, push pull, or full bridge power converter, or a non-isolated power converter, such as a boost, buck, buck boost, or tapped buck power converter, or multiple paralleled converters, although the scope of the invention is not limited in this respect.

In some embodiments, the inductor of the power converter whose current is controlled may be on the input side of the power converter, such as in a boost converter, or the inductor may be on the output side of the power converter, such as in a buck converter, although the scope of the invention is not limited in this respect.

In some embodiments, output load 108 may comprise an electronics system, a mechanical system, or an electromechanical system, such as communication systems, radar systems, infrared sensor systems, laser tracking systems, or directed energy systems, whether ground based, mobile, airborne, shipboard, or spacecraft based, although the scope of the invention is not limited in this respect.

Figure 4:
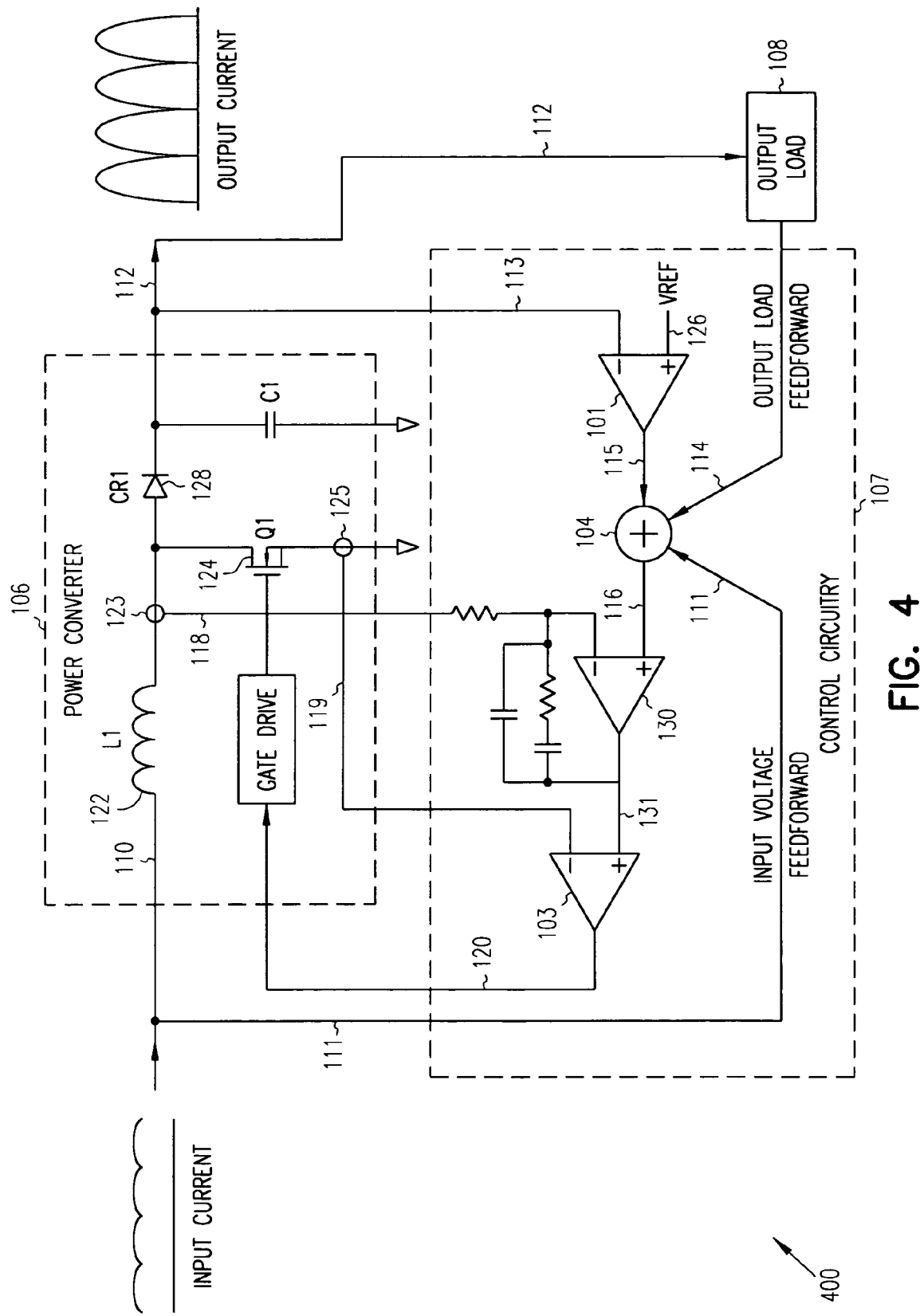
FIG. 4 is a circuit diagram of an active power filter in accordance with some embodiments of the present invention.

FIG. 4 is a circuit diagram of an active power filter in accordance with some embodiments of the present invention. In the embodiments illustrated in FIG. 4, active power filter 400 comprises power converter 106 and control circuitry 107. In these embodiments, current sense signal 118 may comprise a voltage corresponding to a sensed current in inductor 122 of power converter 106. Current sense signal 119 may comprise a voltage corresponding to a sensed current that is switched (i.e., discontinuous) as at either a source or a drain terminal of switching transistor 124 of the power converter, or source or drain terminals of multiple switching transistors of the power converter. In these embodiments, improved noise immunity may be achieved by using a current sense signal 119 comprising a voltage corresponding to a sensed current that is switched, although the scope of the invention is not limited in this respect.

Compensation of current error amplifier 130 may be different than that illustrated, although the scope of the invention is not limited in this respect. Voltage error amplifier feedback circuitry, bias circuitry, and compensation circuitry are not shown for clarity. Summing circuitry 104 may also include additional circuitry, not separately illustrated, to separately weight input signals before combining in a summing element or a summing junction.

In some embodiments, power converter 106 may comprise either an isolated power converter, such as a flyback, forward, push pull, or full bridge power converter, or a non-isolated power converter, such as a boost, buck, buck boost, or tapped buck power converter, or multiple paralleled converters, although the scope of the invention is not limited in this respect.

In some embodiments, the inductor of the power converter whose current is controlled may be on the input side of the power converter, such as in a boost converter, or the inductor may be on the output side of the power converter, such as in a buck converter, although the scope of the invention is not limited in this respect.

In some embodiments, first current sense signal 118 may comprise a voltage corresponding to a sum of sensed current at an input of an output rectifier element 128 and the current of one or more switching transistors 124. In some embodiments, the first and second current sense signals 118 and 119 may be generated by one or more current sensors 123 and 125 comprising either one or more current-sensing resistors or one or more current-sensing transformers. In some embodiments, current sense signals 118 and 119 may be generated by one or more hall-effect current sensors, although the scope of the invention is not limited in this respect. In some embodiments, current sense signals 118 and 119 may be generated by methods presented in Unitrode (Texas Instruments) Application Note U-140, 'Average Current Mode Control of Switching Power Supplies', section titled 'Current Sensing', although the scope of the invention is not limited in this respect. The controlled current may be sensed in different locations than those illustrated.

In some embodiments, output load 108 may comprise an electronics system, or a mechanical system, or an electromechanical system, such as communication systems, radar systems, infrared sensor systems, laser tracking systems, or directed energy systems, whether ground based, mobile, airborne, shipboard, or spacecraft based, although the scope of the invention is not limited in this respect.

In some embodiments of active power filters 300 (FIG. 3) and 400 (FIG. 4), standard average current mode control (as described in Unitrode (Texas Instruments) Application Note U-140, 'Average Current Mode Control of Switching Power Supplies') may be used, i.e., a voltage ramp signal (oscillator ramp) may be provided to the inverting input of comparator 103 instead of current sense signal 119, although the scope of the invention is not limited in this respect. In these embodiments, comparator 103 may generate current regulation signal 120 based on the difference between error amplifier output 131 and a voltage ramp signal (e.g., an oscillator ramp).

The Abstract is provided to comply with 37 C.F.R. section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. Control circuitry for a power converter comprising:
   a voltage error amplifier to generate a voltage error amplifier output based on a difference between an output voltage of the power converter and a reference voltage;
   a current error amplifier to generate a current error amplifier output based on a difference between the voltage error amplifier output and a first current sense signal; and
   a comparator to generate a current regulation signal based on the current error amplifier output and a second current sense signal,
   wherein the current regulation signal is to control current in an inductor of the power converter.

2. The control circuitry of claim 1 wherein the first and second current sense signals comprise a voltage corresponding to a sensed current in the inductor.

3. The control circuitry of claim 1 wherein the current regulation signal comprises a pulse width modulated square wave, and
   wherein the comparator generates the current regulation signal by comparing a difference between the current error amplifier output and the second current sense signal, and
   wherein the current regulation signal is to control an on/off duty cycle of one or more switching transistors of the power converter to control the current in the inductor.

4. The control circuitry of claim 1 wherein the first current sense signal comprises a voltage corresponding to a sensed current in the inductor, and
   wherein the second current sense signal comprises a voltage corresponding to a sensed current that is switched as current in one or more switching transistors of the power converter.

5. The control circuitry of claim 4 wherein the first current sense signal comprises a voltage corresponding to a sum of sensed current at an input of an output rectifier element of the power converter and the current of the one or more switching transistors.

6. The control circuitry of claim 4 wherein the first and second current sense signals are generated by one or more current sensors comprising either one or more current-sensing resistors or one or more current-sensing transformers.

7. The control circuitry of claim 1 further comprising summing circuitry to combine the voltage error amplifier output with an input voltage feedforward signal and an output load feedforward signal to generate a summed signal,
   wherein the current error amplifier is to generate the current error amplifier output based on the summed signal and the first current sense signal.

8. The control circuitry of claim 7 wherein the input voltage feedforward signal corresponds to an input voltage of the power converter, and
   wherein the output load feedforward signal indicates one of a level of an output current, a change in output current, and an anticipated change in output current drawn by an output load receiving the output current from the power converter.

9. The control circuitry of claim 8 wherein the output load comprises at least one of an electronics system, a mechanical system, and an electromechanical system.

10. The control circuitry of claim 7 wherein the first current sense signal comprises a voltage corresponding to a sensed current in the inductor, and
    wherein the second current sense signal comprises a voltage corresponding to a sensed current that is switched as current in one or more switching transistors of the power converter.

11. The control circuitry of claim 7 wherein the first current sense signal comprises a voltage corresponding to a sensed current in the inductor, and
    wherein the comparator is to generate the current regulation signal based on the current error amplifier output and a voltage ramp signal.

12. The control circuitry of claim 7 wherein the current error amplifier integrates a difference between the first current sense signal and the summed signal to regulate an average current level.

13. The control circuitry of claim 1 wherein the power converter comprises a boost power converter implementing average current mode control.

14. The control circuitry of claim 1 wherein at least one of the first and second current sense signals are generated by a hall-effect current sensor.

15. An active power filter comprising:
    a power converter; and
    control circuitry to control an input current drawn by the power converter on a pulse-by-pulse basis, the control circuitry comprising:
    a voltage error amplifier to generate a voltage error amplifier output based on a difference between an output voltage of the power converter and a reference voltage;
    summing circuitry to combine the voltage error amplifier output with an input voltage feedforward signal and an output load feedforward signal to generate a summed signal;
    a current error amplifier to generate a current error amplifier output based on the summed signal and a first current sense signal; and a comparator to generate a current regulation signal based on the current error amplifier output and a second current sense signal.

16. The active power filter of claim 15 wherein the first and second current sense signals comprise voltages corresponding to a sensed current in an inductor of the power converter, wherein the input voltage feedforward signal corresponds to an input voltage of the power converter, and wherein the output load feedforward signal indicates one of a level in output current, a change in the output current, and an anticipated change in the output current, the output current being drawn by an output load receiving the output current from the power converter.

17. The active power filter of claim 16 wherein the first current sense signal comprises a voltage corresponding to a sensed current in the inductor, and wherein the second current sense signal comprises a voltage corresponding to a sensed current that is switched as current in one or more switching transistors of the power converter.

18. The active power filter of claim 16 wherein the first current sense signal comprises a voltage corresponding to a sensed current in the inductor, and wherein the comparator is to generate the current regulation signal based on the current error amplifier output and a voltage ramp signal.

19. The active power filter of claim 16 wherein the current error amplifier integrates a difference between the first current sense signal and the summed signal to regulate an average current level.

20. The active power filter of claim 15 further comprising one or more hall-effect current sensors to generate at least one of the first and second current sense signals.

21. A method for controlling input current drawn by a power converter on a pulse-by-pulse basis comprising:

generating a voltage error amplifier output based on a difference between the output voltage of the power converter and a reference voltage;

summing the voltage error amplifier output with an input voltage feedforward signal and an output load feedforward signal to generate a summed signal;

generating a current error amplifier output based on a difference between the summed signal and a current sense signal; and generating a pulse width modulated current regulation signal based on a difference between the current error amplifier output and a second current sense signal, the current regulation signal to control an input current drawn by the power converter on a pulse-by-pulse basis.

22. The method of claim 21 wherein the first current sense signal comprises a voltage corresponding to a sensed current in the inductor, and wherein the second current sense signal comprises a voltage corresponding to a sensed current that is switched as current in one or more switching transistors of the power converter.

23. The method of claim 21 wherein the first current sense signal comprises a voltage corresponding to a sensed current in the inductor, and wherein the current regulation signal is generated based on the current error amplifier output and a voltage ramp signal.

24. The method of claim 21 further comprising integrating a difference between the first current sense signal and the summed signal to regulate an average input current level.

* * * * *